United States Patent
Kassebaum et al.

(10) Patent No.: US 9,668,618 B1
(45) Date of Patent: Jun. 6, 2017

(54) METHOD OF DISPENSING LIQUID BATHING PRODUCTS

(71) Applicants: Derrik Drue Kassebaum, Ofallon, MO (US); Joseph T. Wurm, St. Charles, MO (US); Joseph A Zuccarello, Dardenne Pr., MO (US); Darin Kassebaum, Wentzville, MO (US)

(72) Inventors: Derrik Drue Kassebaum, Ofallon, MO (US); Joseph T. Wurm, St. Charles, MO (US); Joseph A Zuccarello, Dardenne Pr., MO (US); Darin Kassebaum, Wentzville, MO (US)

( * ) Notice: Subject to any disclaimer, the term of this patent is extended or adjusted under 35 U.S.C. 154(b) by 0 days.

(21) Appl. No.: 14/969,245

(22) Filed: Dec. 15, 2015

Related U.S. Application Data (60) Provisional application No. 62/094,387, filed on Dec. 19, 2014.

(51) Int. Cl.
| | |
|---|---|
| *A01K 13/00* | (2006.01) |
| *A47K 5/122* | (2006.01) |
| *A45D 19/02* | (2006.01) |
| *B65D 83/00* | (2006.01) |
| *A45D 19/00* | (2006.01) |

(52) U.S. Cl.
CPC ............ *A47K 5/122* (2013.01); *A01K 13/001* (2013.01); *A45D 19/02* (2013.01); *B65D 83/0055* (2013.01); *A45D 2019/005* (2013.01)

(58) Field of Classification Search
CPC ... A01K 13/001; A01K 13/003; B65D 75/008
USPC ........ 119/603, 673, 676, 671, 674, 753–757, 119/600, 601; D9/702; 383/104
See application file for complete search history.

(56) References Cited

U.S. PATENT DOCUMENTS

| | | |
|---|---|---|
| 2,517,027 A | 8/1950 | Rado |
| 3,897,005 A | 7/1975 | Reiner |
| 4,236,840 A | 12/1980 | Kennedy |
| 4,275,840 A | 6/1981 | Staar |
| 4,437,587 A | 3/1984 | Duering |
| 4,818,544 A | 4/1989 | Seward |
| 4,836,144 A * | 6/1989 | Cole .................... A01K 13/001 119/651 |
| 5,018,646 A | 5/1991 | Billman |
| 5,109,553 A | 5/1992 | Kishimoto |
| 5,183,006 A * | 2/1993 | Robinson ................. A61D 7/00 119/603 |
| 5,243,931 A * | 9/1993 | McDonough ........ A01K 27/002 119/671 |
| 5,448,966 A * | 9/1995 | McKinnon ............. A61D 11/00 119/676 |
| 5,974,601 A * | 11/1999 | Drane .................... A47K 3/001 4/539 |

(Continued)

*Primary Examiner* — Yvonne Abbott-Lewis
(74) *Attorney, Agent, or Firm* — Linda L Lewis; Dennis J M Donahue; CreatiVenture Law (57) ABSTRACT

A pouch for liquid bathing products suitable for dispensing liquid bathing products and directing the products upward, where the pouch is made of flexible and non-resilient or low-resilience materials, has bilateral symmetry, a shoulder, a base, a two sides, with a gripping portion, and a nozzle approximately centered on the shoulder to dispense the liquid bathing product; the base is sufficiently flat to rest on a flat surface and allow the pouch to stand up-right, and the nozzle is perpendicular to the base.

8 Claims, 9 Drawing Sheets

(56) References Cited

U.S. PATENT DOCUMENTS

| | | | |
|---|---|---|---|
| D436,030 S * | 1/2001 | Tedeschi, Jr. | D9/695 |
| 6,228,375 B1 | 5/2001 | Kocher | |
| 6,241,132 B1 | 6/2001 | Morrison | |
| 6,273,307 B1 | 8/2001 | Gross | |
| 6,485,177 B2 * | 11/2002 | Bell | B65D 75/008 |
| | | | 383/104 |
| 6,553,943 B1 * | 4/2003 | Murphy | A01K 13/001 |
| | | | 119/673 |
| D480,630 S | 10/2003 | Berman | |
| D502,092 S * | 2/2005 | Berman | D9/708 |
| 6,988,467 B1 * | 1/2006 | Smith | A01K 13/001 |
| | | | 119/673 |
| D523,758 S * | 6/2006 | Risgalla | D9/707 |
| D527,274 S * | 8/2006 | Edwards | D9/600 |
| D528,011 S * | 9/2006 | Ueda | D9/702 |
| D532,703 S * | 11/2006 | Wild | D9/442 |
| 7,306,095 B1 * | 12/2007 | Bourque | B29C 65/76 |
| | | | 206/219 |
| D560,122 S * | 1/2008 | Fuchs | D9/708 |
| 7,497,188 B2 | 3/2009 | Cho | |
| 7,503,284 B2 * | 3/2009 | Boylan | A01K 13/001 |
| | | | 119/603 |
| D593,870 S * | 6/2009 | Wehling | D9/708 |
| 7,793,618 B2 | 9/2010 | Edwards | |
| 8,061,563 B1 | 11/2011 | Rosen | |
| 8,181,823 B2 * | 5/2012 | Fukuizumi | B31B 37/00 |
| | | | 206/484 |
| 8,555,819 B1 | 10/2013 | McFarland | |
| D764,931 S * | 8/2016 | Ueda | D9/702 |
| D772,075 S * | 11/2016 | Bell | D9/708 |
| 2002/0166779 A1 | 11/2002 | Etesse | |
| 2003/0029884 A1 * | 2/2003 | Rau | B65D 75/58 |
| | | | 222/92 |
| 2004/0264816 A1 | 12/2004 | Carter | |
| 2005/0109796 A1 * | 5/2005 | Bourque | B65D 81/3261 |
| | | | 222/94 |
| 2007/0039559 A1 * | 2/2007 | Foster | A01K 13/001 |
| | | | 119/676 |
| 2008/0199108 A1 | 8/2008 | Rogers | |
| 2008/0247682 A1 * | 10/2008 | Murray | B31B 23/00 |
| | | | 383/104 |
| 2009/0008103 A1 | 1/2009 | Cordani | |
| 2009/0114677 A1 | 5/2009 | Stuart | |
| 2009/0208630 A1 | 8/2009 | Koh | |
| 2013/0318916 A1 * | 12/2013 | Hensen | B65D 75/008 |
| | | | 53/266.1 |

* cited by examiner

METHOD OF DISPENSING LIQUID BATHING PRODUCTS

CROSS-REFERENCE TO RELATED APPLICATIONS

This application claims priority from U.S. Provisional Patent Application No. 62/094,387 filed Dec. 19, 2014 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to bathing a pet, and more particularly to a method using a flexible, low-resilient or non-resilient squeeze container of liquid bathing product having a gripping portion and a centered, upward-directed nozzle to dispense the liquid bathing product in an upward direction.

Related Art

Prior art devices have been used for containing liquid bathing products and dispensing liquid bathing product on a pet. Many pets are bathed when standing on their legs in unwilling compliance with the process. A pan or bath can be used to hold water for the pet to stand in, and the liquid bathing product is administered out of a container. However, the containers are either rigid, such as glass or rigid and resilient, such as high density polyethylene, and cannot be used to direct a stream of liquid bathing product upward to dispense directly on the pet's underside and hard to reach places when the pet is standing. Because the containers are often resilient, after an initial squeeze to start a short shampoo stream, the squeeze is relaxed and air is sucked into the container as it returns to its original, un-squeezed shape. In the upright position, the headspace inside the container has air, with the liquid shampoo below it. With the container opening pointing up, the next squeeze pushes out the air, but little shampoo. So to dispense the shampoo, the container is up-ended, the shampoo moves downward to the container opening, and shampoo is applied downward onto the pet's back or neck. The shampoo must then be worked downward and under the pet's underside, which is often the dirtiest part of the pet's body.

Pouches have been disclosed in the prior art. U.S. Pat. No. 3,897,005, U.S. Pat. No. 4,275,840, U.S. Pat. No. 6,228,375, U.S. Pat. No. 7,793,618, U.S. 2004/0264816, U.S. 2009/0008103, and U.S. 2009/0208630 all disclose pouches, many modified to provide a spraying effect. None of these pouches, however, provide the present invention's method of dispensing liquid bathing product upward on a pet's underside or hard to reach places, nor do they provide the gripping portion that improves the dispensing of liquid bathing product.

Pouches modified to direct the stream of liquid include U.S. Pat. No. 4,437,587, U.S. Pat. No. 8,061,563, U.S. Pat. No. 4,818,544, and U.S. Pat. No. 5,018,646. U.S. D527,274 is a patent disclosing a soft squeezable animal shampoo dispenser.

U.S. Pat. No. 5,974,601 discloses a specially designed dog bath system using water from a hand held flexible shower head. U.S. Pat. No. 6,553,943 discloses a pedestal stand dog bath that uses water from a hand held flexible shower head. U.S. Pat. No. 7,497,188 discloses fully enclosed pet bathing apparatus using spray water nozzles.

U.S. Pat. No. 4,236,840, U.S. Pat. No. 5,109,553 and U.S. Pat. No. 8,555,819 disclose a brush for shampooing a dog that has a soap chamber and is connected to a pressured water source to dispense water and shampoo on a dog.

None of the above cited references disclose the present invention.

SUMMARY OF THE INVENTION

The present invention relates to a pouch for liquid bathing products suitable for directing liquid bathing product upward, where the pouch is made of flexible and non-resilient or low-resilience materials. The pouch has bilateral symmetry, has a shoulder, a base, a two sides, with a gripping portion, and a nozzle approximately centered on the shoulder to dispense liquid bathing product. The base is sufficiently flat to rest on a flat surface and allow the pouch to stand up-right and the nozzle is perpendicular to the base.

The pouch with liquid bathing product of the present invention is used in a method of the present invention to bath a pet by standing the pet on its legs with its underside (belly) down, holding the container in an upright position under the pet and squeezing to dispense the liquid bathing product upward toward or near the pet's underside, thereby wetting the underside with the liquid bathing product. The container can also be angled sideways or downward as well to dispense liquid bathing product on the sides, rear, and back of the pet.

The pouch with liquid bathing product of the present invention is further used in a method of the present invention to dispense shampoo or other bathing products on a patient's head who, because of injury, disability, impairment which limits the motion of arms and/or shoulders, or surgery cannot lift her arms above her head to dispense shampoo or other liquid products, on top of her head. The shampoo is dispensed upward by squeezing the pouch, directing the shampoo upward toward the top of the head, where the patient can work the shampoo into the hair and then rinse it without lifting her hands above her head.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 7:
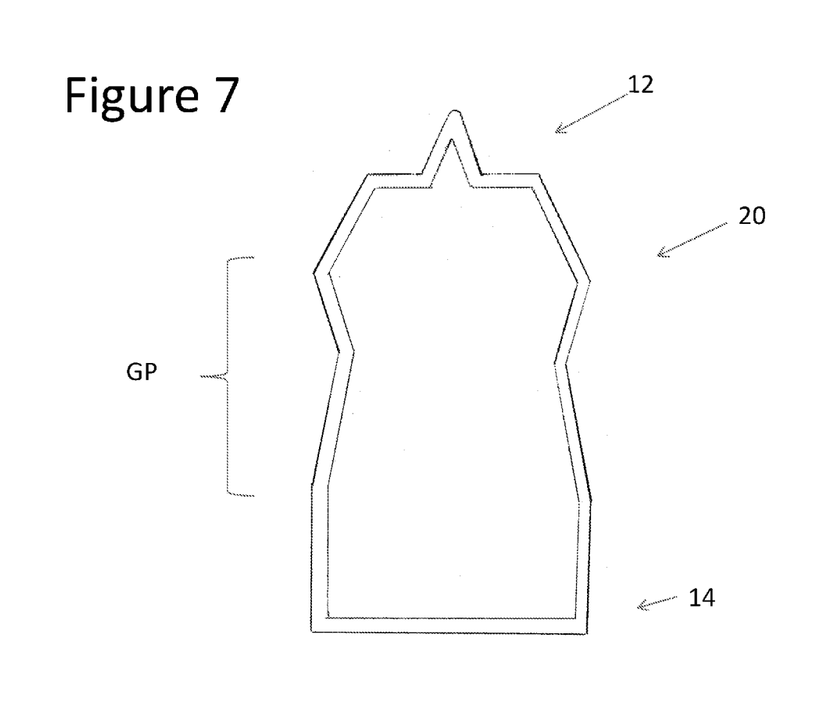
FIG. 7 is a front elevational view of a pouch with a die cut nozzle.

The present invention comprises a pouch 20 for containing liquid bathing products which is made from a flexible, heat-sealable, polymeric sheet or from a flexible, paperboard or metal foil sheet having a heat-sealable, polymeric lining. The pouch has two opposed, flexible sides 22 sealed to one another so as to define an interior region 24, which is adapted to contain liquid bathing products. The pouch has an opening 26 which opens to the interior region. The opening may be adapted to receive a fitment 10, which optionally may incorporate a dispensing valve, a removable cover, or other similar or dissimilar features and which is molded from a polymeric material that can be heat-sealed to the flexible sides of the pouch. Alternatively, the opening may be a die cut nozzle without a fitment as is shown in FIG. 7.

The term bathing products includes liquid shampoos, conditioners, detergents, soaps, cleansers, rinses, body washes, moisturizers, scrubs, etc.

Figure 1:
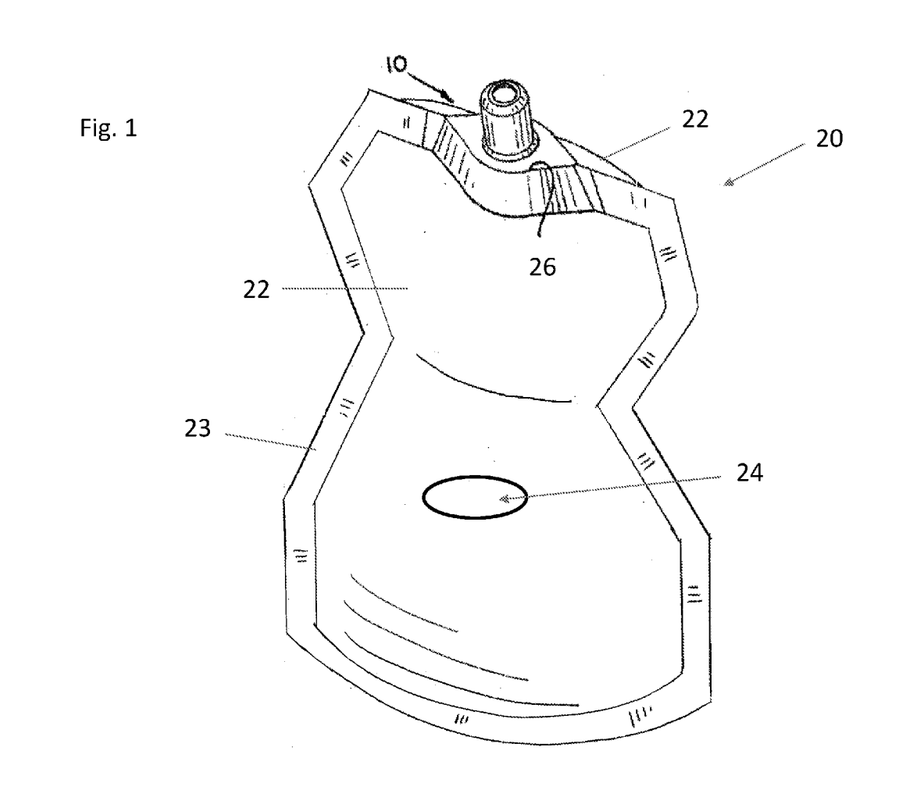
FIG. 1 is a perspective view of the pouch of the present invention equipped with a fitment, from an upper, front, right-side vantage.
Figure 2:
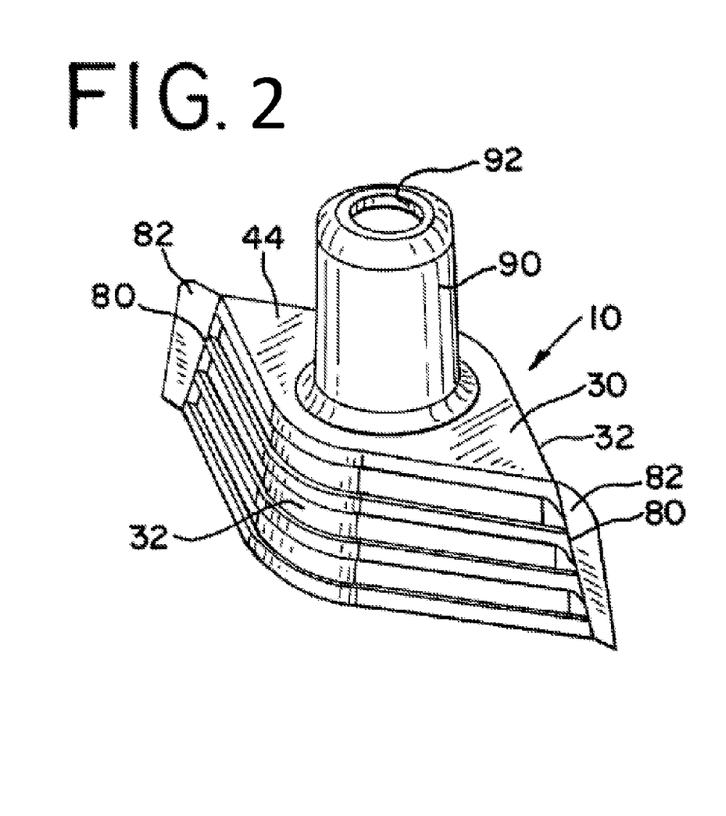
FIG. 2 is a detailed perspective view of the fitment illustrated in FIG. 1 from an upper, front, right-side vantage.
Figure 3:
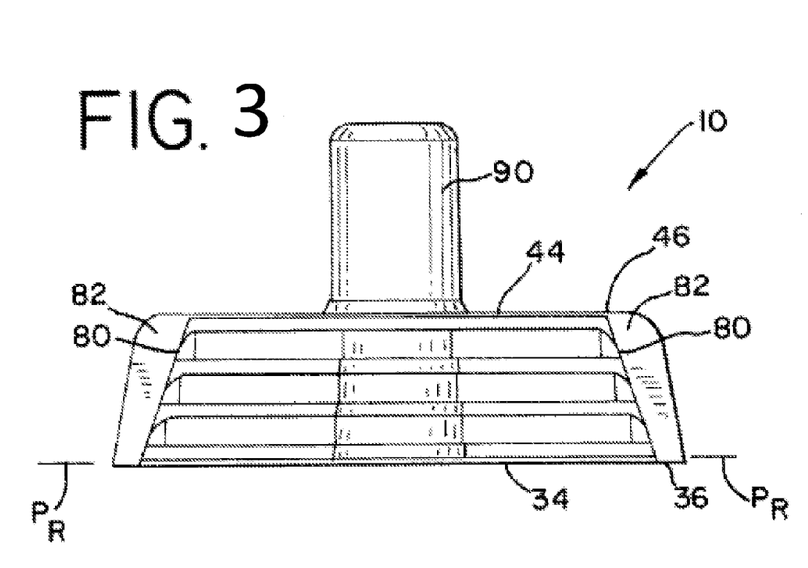
FIG. 3 is a front elevational view of the fitment illustrated in FIG. 2.

An example of a suitable fitment is disclosed in U.S. Pat. No. 6,273,307, which is hereby incorporated by reference. The present invention is not limited to this fitment, which is disclosed as an example of a suitable fitment. Any of a number of fitments are suitable for the present invention, and include a screw-off cap, a twist-off cap, a snap-off cap and a cap with a hinged snap-on cover. As illustrated in FIGS. 1, 2, and 3, fitment 10 is sealed to pouch 20 for containing liquid bathing product. The pouch 20 is made to have two opposed, flexible sides 22, as shown in FIG. 1. The sides 22 have a seal 23 to define an interior region 24, as shown in the cut-away in FIG. 1, and so as to define an opening 26, which opens to the interior region 24 and which is adapted to receive the fitment 10 when the fitment 10 is sealed to the pouch 20.

As shown in FIGS. 2 and 3, the fitment 10 is molded from a polymeric material, high density polyethylene (HDPE) being preferred, which is suitable to be sealed to the sides 22 of the pouch 20 by ultrasonic bonding, which is preferred, adhesively, or otherwise. The fitment 10 is molded so as to have a cup-like body 30 opening downwardly and having two opposite, side wall portions 32, as indicated in FIG. 3, and an inner end 34 and an outer end 44, as indicated in FIG. 3. The inner end 34, which has an outer periphery 36, faces the interior region 24 of the pouch 20 when the fitment 10 is sealed to the pouch 20. The outer end 44 has an outer periphery 46. The outer periphery 36 of the inner end 34 of the fitment 10 defines a reference plane PR.

Figure 4:
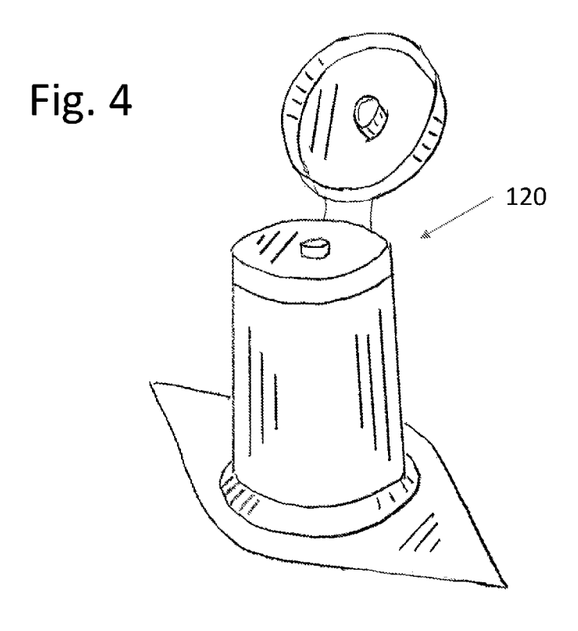
FIG. 4 is a perspective view of a fitment with a hinged flip-cap closure.

As viewed from either of the inner and outer ends 34, 44, the body 30 of the fitment 10 has a boat-shaped periphery defining two opposite edges 80 and defining the opposite, side wall portions 32. See FIG. 2. Moreover, as molded, the fitment has a fin 82 projecting from each of the opposite edges 80. When the pouch 20 is sealed to the fitment 10, the flexible sides 22 and the fins 82 tend to fuse together. Furthermore, the fitment 10 has a unitary, tubular spout 90 projecting upwardly from the outer end 44 of the body 30 and defining a passage 92 which extends through the spout 90 and which opens into the pouch 20 when the pouch 20 is sealed to the fitment 10. FIG. 4 shows a hinged snap-cap fitment 120 suitable for the pouch 20.

Figure 5:
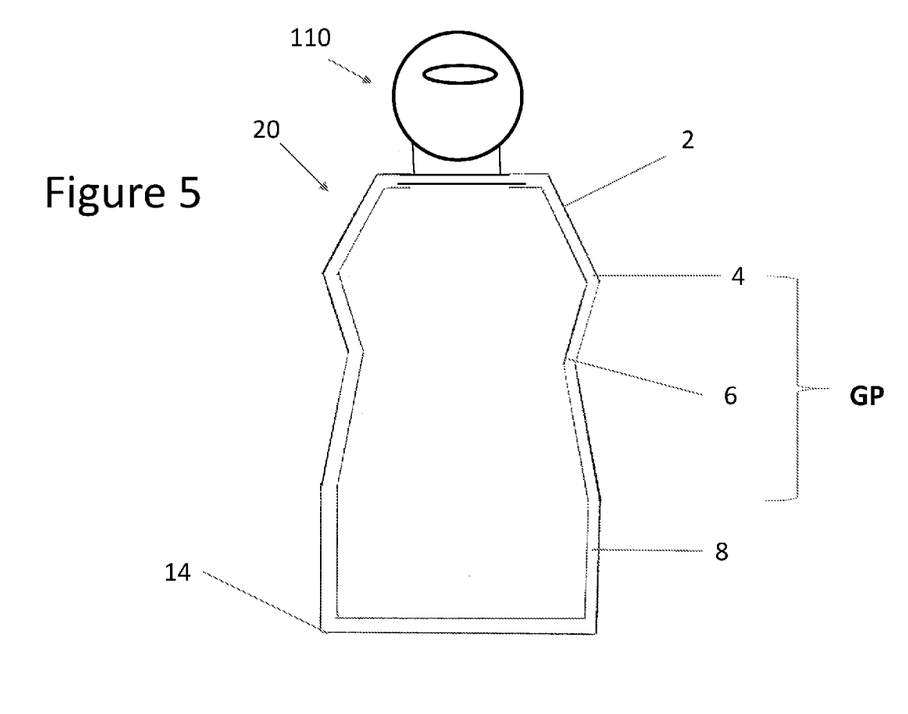
FIG. 5 is an embodiment of the present invention as a front elevational view of a pouch equipped with a twist off top.

In an embodiment of the invention, as shown in FIG. 5, the pouch 20 has a twist-off fitment 110. The pouch is designed for gripping with one hand while being used. To facilitate the gripping, particularly if the hand is wet or soapy, a gripping portion GP of the pouch is created. The gripping portion is created by an upper protrusion 4, a middle indentation 6, and a lower protrusion 8. The fitment 110 is located approximately in the middle of the pouch shoulder 2 and is directed upward. The pouch has a base 14 which is sufficiently flat to rest on a flat surface and hold the pouch upright when stored. The fitment 110 is approximately perpendicular to the base 14 when the pouch is store upright. In a preferred embodiment, the pouch shoulder 2 is narrow relative to the dimensions of the rest of the pouch. The upper protrusion 4 and the lower protrusion 8 are approximately the same width, but spaced apart by the middle indentation 6, which is spaced approximately ⅓ to ½ of the distance from the shoulder 2 to the base 14. The gripping portion is about mid-way between the shoulder and the base.

Figure 6:
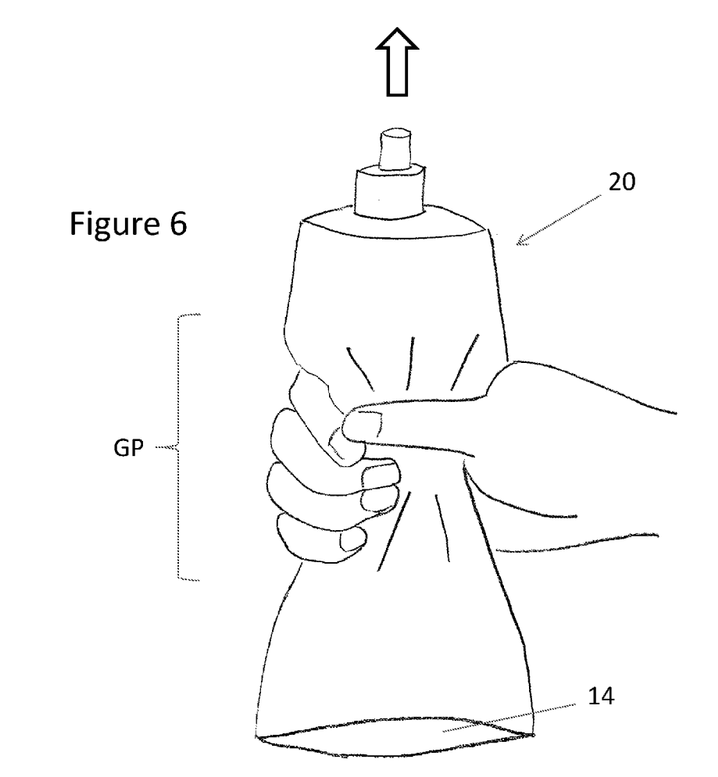
FIG. 6 is an embodiment of the present invention as a front elevational view of the pouch being squeezed by a hand and the liquid being dispensed upward.

The angles created by the protrusions are oblique, creating a gripping portion that is readily accessible. The upper protrusion and the lower protrusion are spaced apart to facilitate gripping. The gripping portion is preferably from about 3 to 5 inches long. In a preferred embodiment, the length from the shoulder to the upper protrusion is about equal to the length from the lower protrusion to the base. In another preferred embodiment, the length of the gripping portion is about twice the length from the shoulder to the upper protrusion. In another preferred embodiment, the height of the pouch, from the top of the fitment to the base is from about 7 to 9 inches, the width from side to side is from 3 to 5 inches, and the depth from front to back is from about 1 to 3 inches. As shown in FIG. 6, the gripping portion allows the gripping hand to securely hold and squeeze the pouch 20, directing the liquid bath product upward.

In another embodiment of the present invention, as shown in FIG. 7, the pouch 20 has a die cut nozzle 12 in place of a fitment.

Figure 8:
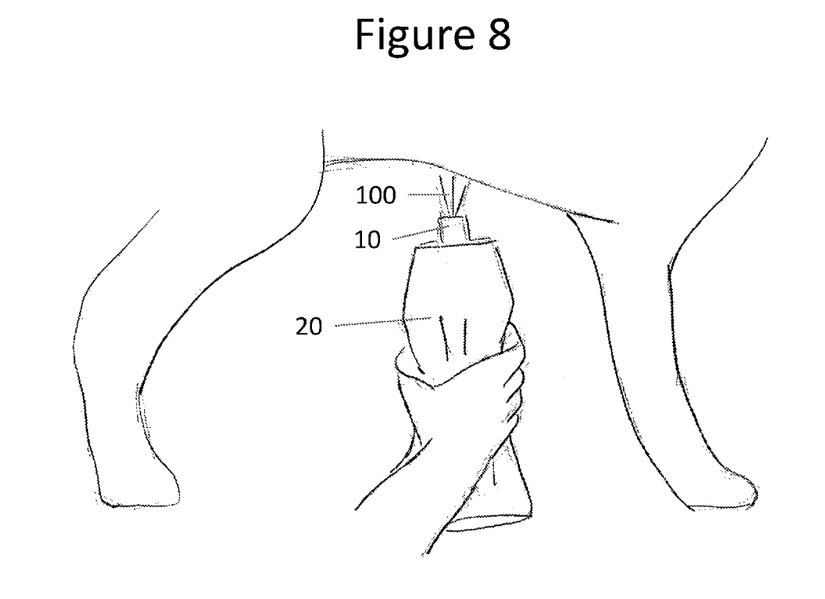
FIG. 8 is an embodiment of a front elevational of the pouch of FIG. 6 being used to dispense liquid bathing product onto the belly of a dog.

Illustrating the method of bathing a pet, FIG. 8 shows the use of the pouch of the present invention being squeezed upward to dispense upward the liquid bathing product 100 directly onto the underside of a standing pet.

In a preferred embodiment of the present invention, the pouch is designed to hold from about 6 to 20 ounces of shampoo. In a more preferred embodiment, the pouch is designed to hold from about 10 to 14 ounces of shampoo. In a more preferred embodiment, the pouch is a single-use pouch, designed to be entirely used up in one bath. In another preferred embodiment, the shampoo is diluted with water so that little mixing with water is required when the shampoo is dispensed onto the pet. Preferably the shampoo is present from about 10:1 to 1:10 wt. % shampoo to water dilution. The diluted shampoo more readily lathers and requires less working into the pet's fur than is concentrated shampoo which is more viscous. A further advantage of dispensing diluted shampoo is that there are no spots of concentrated shampoo in the fur that requires extra rinsing after the animal has been bathed.

Figure 9:
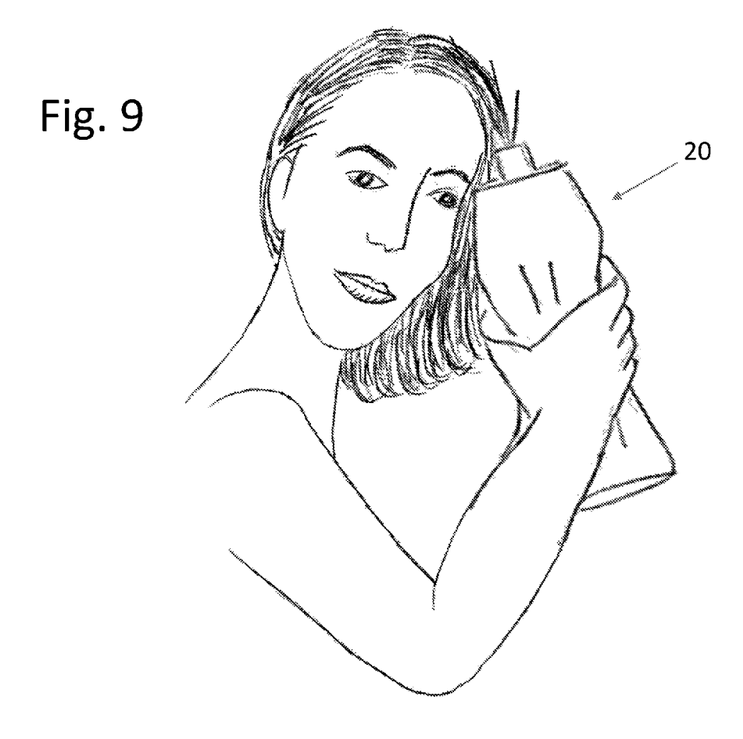
FIG. 9 is an embodiment of a front elevational of the pouch of FIG. 6 being used to dispense liquid bathing product onto the hair of a person.

As shown in FIG. 9, in another embodiment of the invention, the pouch 20 is used to dispense liquid bath product, such as shampoo, upward to the hair and head. When a patient has had shoulder surgery or open-heart surgery, she is instructed to not raise her hands above her head for as long as three to five months. With the typical shampoo container, she cannot apply shampoo to the top of her head and hair while standing or sitting upright without raising her hands above her head. With pouch of the present invention, when the pouch is squeezed with one hand, the shampoo is directed upward toward the top of the head, allowing the patient to shampoo her hair. Other products, such as rinses or conditioners can be applied in a similar manner.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of bathing a pet comprising:
standing the pet on its legs with its underside down;
holding a pouch in an upright position under the pet;
squeezing the pouch to dispense the liquid bathing product upward toward or near the pet's underside; and
wetting the underside with the liquid bathing product;
wherein the pouch is made of flexible and non-resilient or low-resilience materials;
wherein the pouch has a shoulder, a base, two sides which are sealed to define an interior region, and a nozzle centered on the shoulder to dispense liquid bathing product;
wherein the base is sufficiently flat for the pouch to rest upright on a flat surface;
wherein the nozzle is approximately perpendicular to the base;
wherein the interior region contains liquid bathing product;
wherein the liquid bathing product comprises shampoo diluted from about 10:1 to 1:10 wt. % shampoo to water dilution; and
wherein the pouch has a gripping portion that allows the bathing product to be dispensed upward through the nozzle by squeezing the pouch with one hand.

2. The pouch of claim 1, wherein the gripping portion comprises an upper protrusion, a lower protrusion and a middle indentation.

3. The pouch of claim 2, wherein the angles created by the gripping portion are oblique.

4. The pouch of claim 3, wherein the length from the shoulder to the upper protrusion is approximately equal to the length from the lower protrusion to the base.

5. The pouch of claim 3, wherein the length of the gripping portion is about twice the length from the shoulder to the upper protrusion.

6. The pouch of claim 3, wherein the gripping portion is from about 3 to 5 inches long.

7. The pouch of claim 1, wherein the nozzle is die-cut.

8. The pouch of claim 1, wherein the nozzle is selected from the group consisting of a screw-off cap, a twist-off cap, a snap-off cap and a cap with a hinged snap-on cover.

* * * * *